(12) United States Patent
Maeda et al.

(10) Patent No.: US 6,209,728 B1
(45) Date of Patent: Apr. 3, 2001

(54) FILTER ELEMENT

(75) Inventors: Yoshihisa Maeda; Go Endoh, both of Ibaraki (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 09/382,634

(22) Filed: Aug. 25, 1999

(30) Foreign Application Priority Data

Sep. 18, 1998 (JP) .................................................. 10-264803

(51) Int. Cl.⁷ .................................................. B01D 33/00
(52) U.S. Cl. .............................. 210/356; 55/490; 55/521; 210/488; 210/497.01
(58) Field of Search ..................................... 210/354, 356, 210/357, 488, 489, 497.01, 497.1, 493.1, 493.5; 55/490, 521

(56) References Cited

U.S. PATENT DOCUMENTS

| 3,937,281 | 2/1976 | Harnsberger | 210/356 |
| 4,292,178 | 9/1981 | Mori et al. | 210/488 |
| 4,430,232 | * 2/1984 | Doucet | 210/356 |
| 4,690,761 | 9/1987 | Orlans | 210/488 |
| 4,707,259 | * 11/1987 | Doucet | 210/356 |
| 4,804,481 | 2/1989 | Lennartz | 210/791 |
| 5,792,353 | * 8/1998 | Jungi et al. | 210/356 |

FOREIGN PATENT DOCUMENTS

| 438 220 | 11/1967 | (CH) . |
| 0 057 670 | 8/1982 | (EP) . |
| 0 159 961 | 10/1985 | (EP) . |
| 2 201 902 | 9/1988 | (GB) . |
| WO 91/02578 | 3/1991 | (WO) . |
| WO 93/07944 | 4/1993 | (WO) . |

* cited by examiner

Primary Examiner—Joseph W. Drodge
(74) Attorney, Agent, or Firm—Oblon, Spivak, McClelland, Maier & Neustadt, P.C.

(57) ABSTRACT

A filter medium, which is resiliently expandable in an axial direction and is able to deform the filtration gaps in size in accordance with its expansion, including a compression limiting member for providing required filtration gaps by limiting the amount of compression applied to the filter medium. The filter medium is held by a holder in such a manner that the amount of compression may be adjustable.

5 Claims, 9 Drawing Sheets

FILTER ELEMENT

FIELD OF THE INVENTION

The present invention relates to a filter element to be used in a filtering apparatus for filtering a fluid.

DESCRIPTION OF THE RELATED ART

Conventionally, as a filter element to be attached to the filtering apparatus for filtering a fluid, various kinds of filter elements having various structures are known.

Filter elements as described above are, however, generally disposable type, and even though they are reusable by cleaning, much time and effort is required to recover them because it is hard to remove foreign materials deposited thereon, or sometimes they have to be soaked into a specific chemical agent for a long time to remove the same.

Therefore, it would be desirable if foreign materials deposited on a filter element can be easily removed and thus the filter element is easily recovered for reuse.

DISCLOSURE OF THE INVENTION

An object of the present invention is to provide filter elements with enhanced ease-of-handle features and excellent usability which can filter out foreign materials to be removed from a fluid satisfactorily and from which deposited foreign materials blocking the filtration gaps can be easily washed out in a short period of time.

In order to achieve above described challenge, according to the present invention, a filter element comprising a cylindrical filter medium and a holder for holding the filter medium is provided. The filter medium is constructed to be resiliently expandable in the direction of axis and to be subject to deformation of the filtration gaps in varying sizes in accordance with the expansion thereof. The filter medium includes a compression limiting means for providing required filtering gaps by limiting the amount of compression applied to the filter medium, and is held by the holder in such a manner that the amount of compression can be adjusted.

According to the present invention, the filter medium is made of a hard resilient material having no compressibility in itself.

According to a detailed embodiment of the present invention, the filter medium is formed by winding a resilient wire rod in a helical fashion including filtration gaps between adjacent wound portions and a plurality of notches for providing the filtration gaps between adjacent wound portions. The notches may be formed by bending parts of the resilient wire rod.

According to another detailed embodiment of the present invention, the filter medium is formed by stacking a plurality of annular resilient plates, and each plate has a plurality of spring portions for resiliently widening the space between adjacent plates and a plurality of projections for providing filtering gaps between adjacent plates when the filter medium is under compression. The spring portions and projections may be formed by making incisions on the plate and raising them up.

According to still another detailed embodiment of the present invention, the filter medium is formed by stacking a plurality of annular spring members and a plurality of annular gap forming members alternately in layers. The spring members are corrugated in the direction of their thickness to be resiliently deformed into the shape of flat plates when the filter medium is under compression. The gap forming members is provided with a plurality of radially extending filtration channels thereon. The filtration channels may be formed on both front and back surfaces of the gap forming members.

The filter element according to the present invention, having structure described so far, is provided with required filtration gaps in the state that the filter medium is compressed to ensure that a fluid is filtered through these filtration gaps. In order to release the compressed state of the filter medium for cleaning, the filtration gaps can be expanded sufficiently by manual operation, by means such as an actuator, or by resilience of a resilient wire rod and/or resilient plates which constitute the filter medium, so that foreign materials deposited on the filter element may be removed easily and satisfactory.

In other words, in the case where the filter medium is configured in the form of coil by a resilient wire rod, when it is under compression, the filtration gaps are provided by notches formed on the resilient wire rod, and when it is removed from the filtering apparatus, the resilient wire rod is expanded because the filter medium is released from compressed state and thus the filtration gaps widen more or less uniformly.

In the case where the filter medium is configured by annular resilient plates, when it is under compression, the filtration gaps in constant widths are provided by means of projections formed on the respective plates, and when it is released from the compressed state, the filtration gaps provided between adjacent plates is widened by spring portions formed on the respective plates.

In addition, in the case where the filter medium is configured by stacking spring members and gap forming members alternately, when the filter medium is under compression, the spring members are flattened into the shape of plates respectively and then filtration gaps of uniform width are provided by the filtration channels formed on the gap forming members. When compression is released, the filtration gaps are widened by restoration of spring members corrugated in the direction of the thickness.

Since the filtration gaps of the filter element can be easily widened as described above, foreign materials filtered out may easily be removed by cleaning. Especially when the filter medium is formed of separate resilient plates or spring members, or of the gap forming members etc., easier cleaning is ensured because they may be disassembled into pieces for cleaning. In addition, the above mentioned disassembled members may be reassembled with relative ease and thus foreign materials may be removed more easily. With such a structure, the filter element itself is readily recoverable and reusable.

DESCRIPTION OF THE PREFERRED EMBODIMENTS

Figure 1:
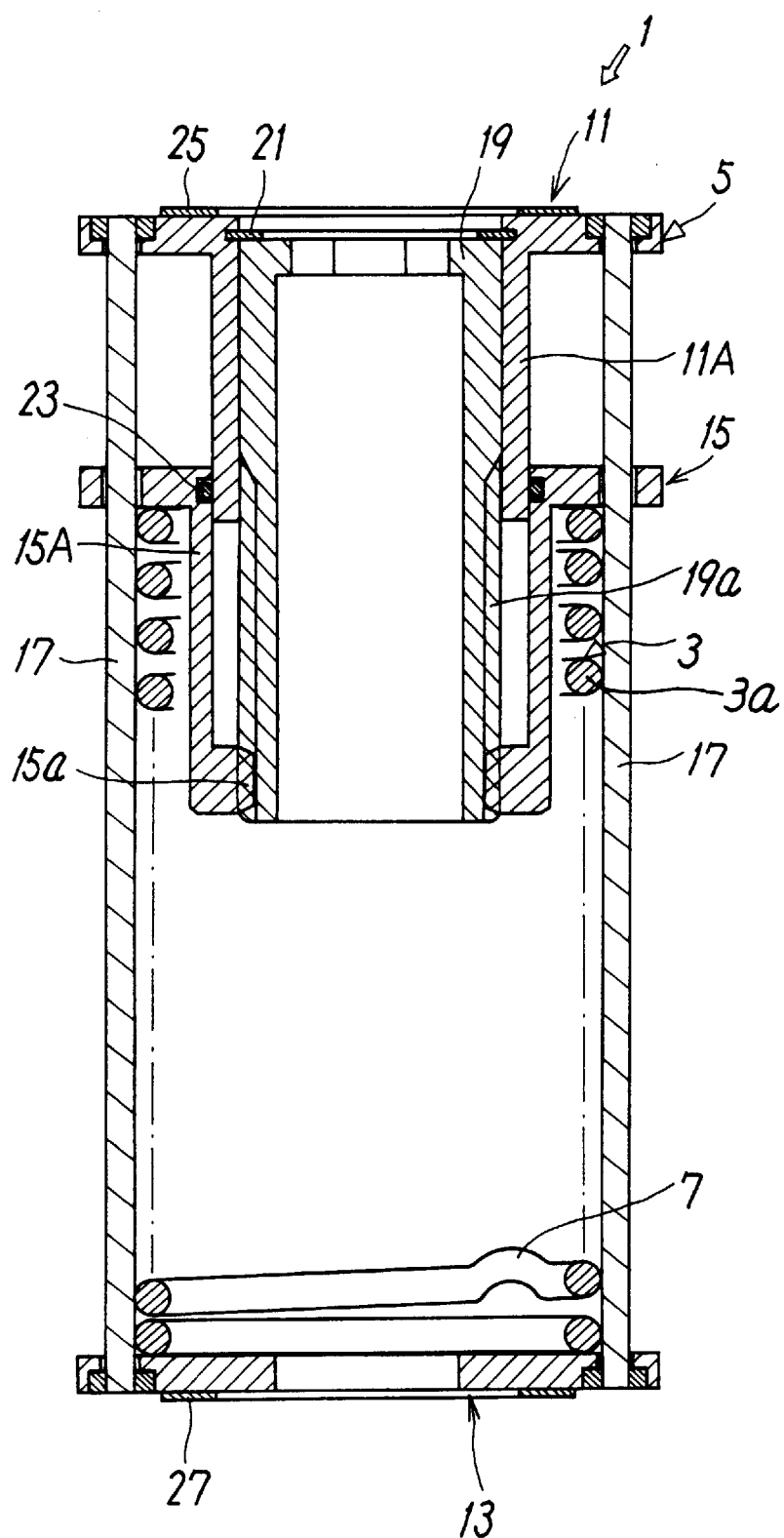
FIG. 1 is a sectional side elevation view of a filter element according to the first embodiment of the present invention.

Referring now to the drawings, there are shown some preferred embodiments of a filter element according to the present invention in detail. FIGS. 1–4 show the first embodiment of a filter element of this invention.

Figure 2:
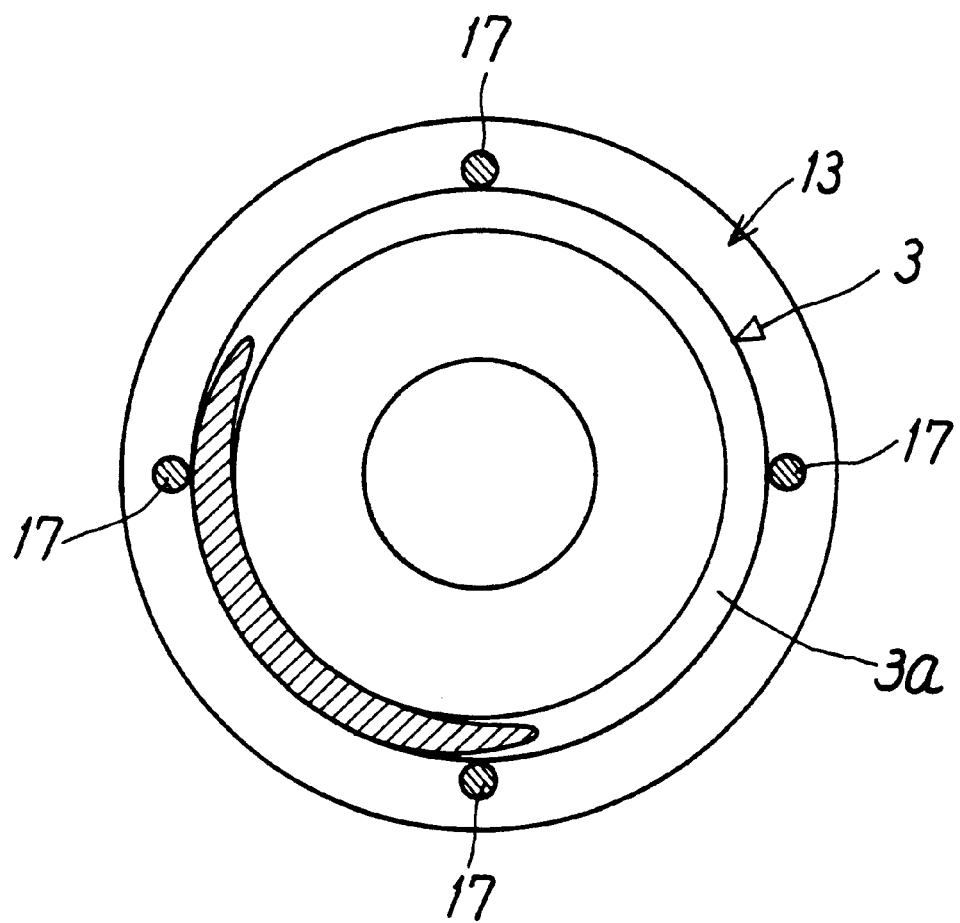
FIG. 2 is a horizontal sectional view of the same filter element.

A filter element 1 is to be mounted in the filtering apparatus for filtering a fluid, comprising, as shown in FIGS. 1 and 2, a cylindrical filter medium 3 which is resiliently expandable in the direction of axis, and a holder 5 for holding the filter medium 3 in the compressed state.

Figure 3:
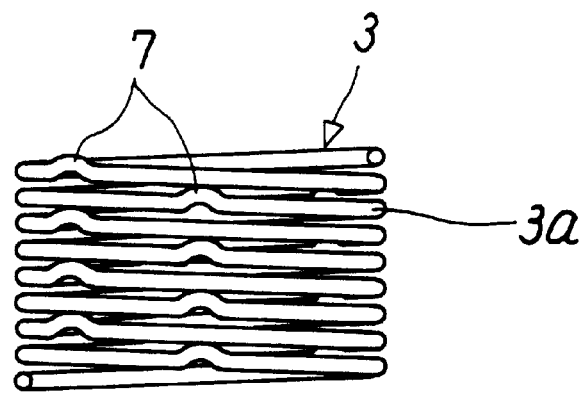
FIG. 3 is a side elevational view of a resilient wire rod under compression.
Figure 4:
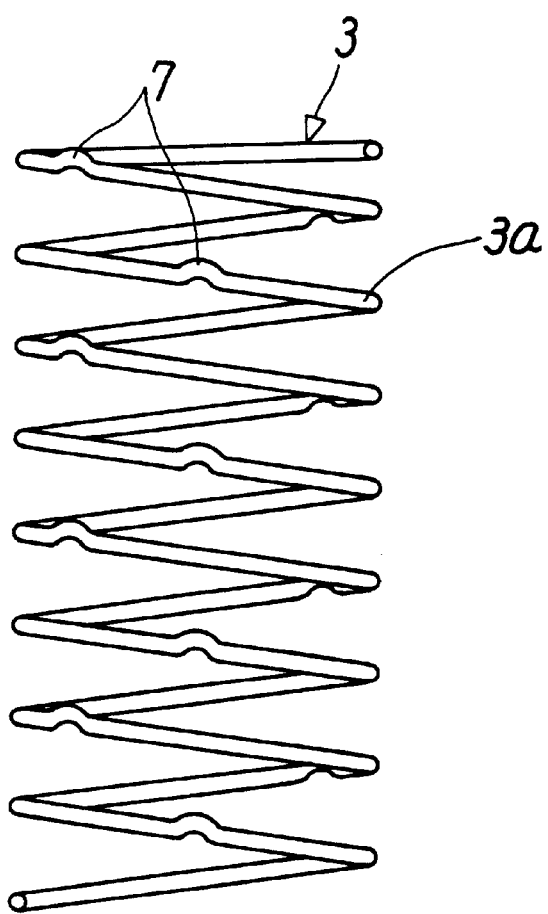
FIG. 4 is a side elevational view of the same resilient wire rod in the state where compression is released.

The filter medium 3 is, as shown in FIG. 2–4, formed by winding a hard resilient wire rod 3a made of material having no compressibility in itself such as metal or ceramics in a helical fashion, and is provided with a designated number of notches 7 per unit turn formed by locally bending parts of the resilient wire rod 3a nearly equidistantly. As clearly shown in FIG. 3, the formation of such notches 7 provides filtration gaps corresponding to the height of the notches 7 between adjacent parts of winding when the filter medium 3 is compressed. Therefore, the notches 7 constitute a compression limiting means for providing required filtration gaps by limiting the amount of compression applied to the filter medium 3. The filter medium 3 is held by the holder 5 with its ends caught between an end plate 13 and a movable plate 15 of the holder 5.

The holder 5 comprises, as shown in FIGS. 1 and 2, a plurality of guide bars 17 surrounding the filter medium 3 equidistantly, end plates 11, 13 secured to the both ends of these guide bars, and a movable plate 15 mounted to the guide bars between these end plates 11, 13 in inserted state and movable only in directions along these guide bars.

The end plate 11 is provided with a cylindrical guide cylinder portion 11A extending through the center portion of the holder 5 toward the other end plate 13, and within the guide cylinder portion 11A, a rotating body 19 having a threaded portion 19a on its periphery is rotatably received and retained by a C-frame retaining ring. The movable plate 15 is slidably fitted around the outer surface of the guide cylinder portion 11A of the end plate 11 via a O-ring 23 and has a cylindrical portion 15A extending toward the same direction as the guide cylinder portion 11A, and on the inner surface of the end portion of the cylindrical portion 15A, there is provided a threaded portion 15a for screwing in the threaded portion 19a prepared on the outer surface of the rotating body 19. In this arrangement, by rotating the rotating body 19, the movable plate 15 may be reciprocated along the guide bars 17.

By placing the filter medium 3 between the end plate 13 and a movable plate 15 and moving the movable plate 15 toward end plate 13 while rotating the rotating body 19, the filter medium 3 is compressed until the position where respective notches 7 come into pressing contact with adjacent wound portions, and thereby the filter medium 3 is held by a holder under compression with filtration gaps provided between adjacent wound portions by notches 7.

Reference numbers 25 and 27 in FIG. 1 denote packings mounted on the outer surfaces of the end plates 11 and 13, respectively.

In the filter element 1 of the first embodiment having above described structure, filtration gaps of the predetermined widths are provided on its side wall by means of notches 7 formed on a resilient wire rod 3a (FIG. 3), and thereby a fluid flowing between the inside and the outside of a cylindrical filter medium 3 is filtered. When the filter medium 3 is resiliently expanded (FIG. 4) by moving the movable plate 15 away from the end plate 13 along the guide bar 17 while rotating the rotating body 19 in the holder, the filtration gaps may be sufficiently widened.

Therefore, when cleaning the filter element, foreign materials filtered out by the filter element 1 may be removed easily and satisfactory, and thereby the filter element 1 itself may be recovered and reused.

Figure 5:
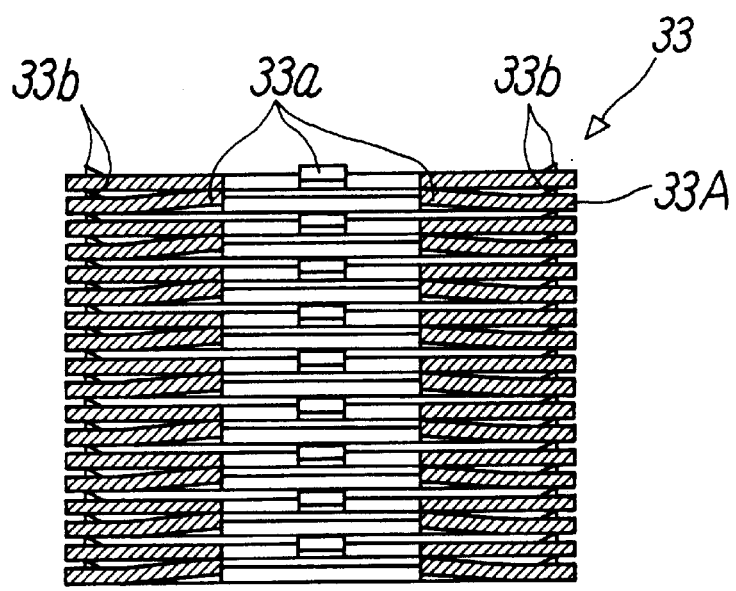
FIG. 5 is a sectional side elevational of a laminated body of plates according to the second embodiment illustrating the compressed state.
Figure 6:
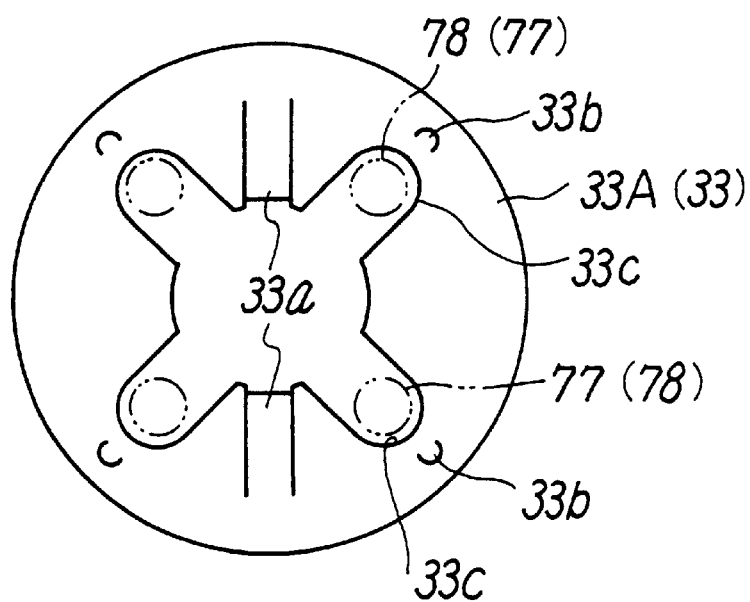
FIG. 6 is a plan view of the same laminated body of plates.
Figure 7:
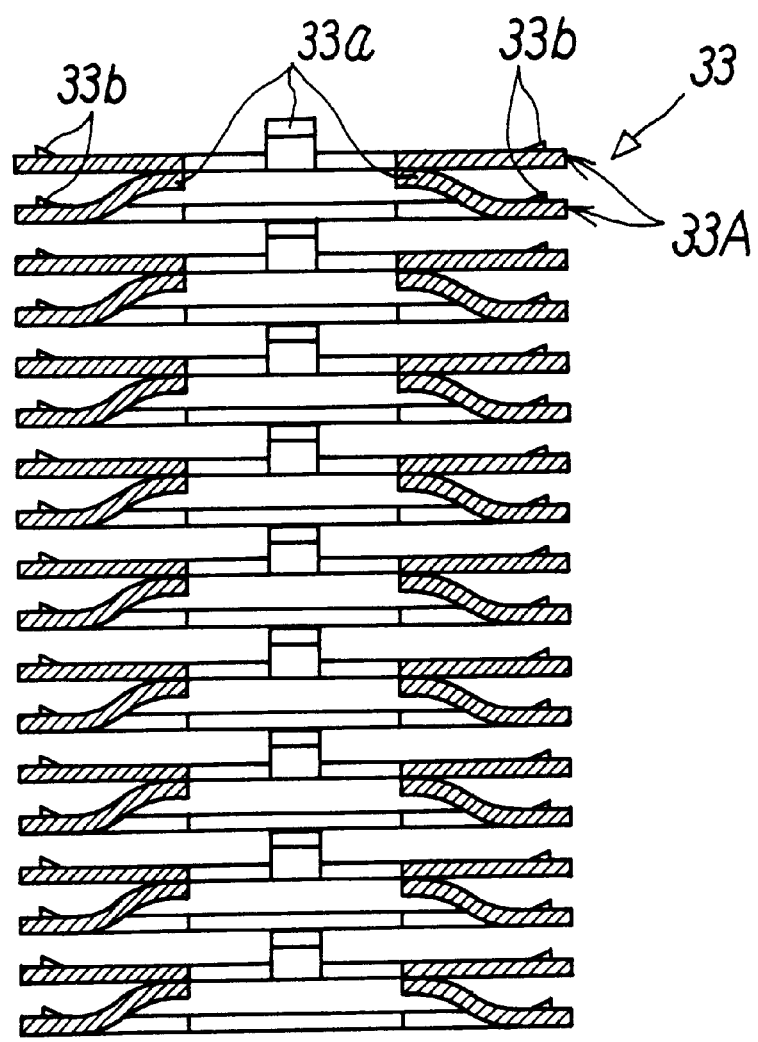
FIG. 7 is a sectional side elevational of the same laminated body of plates illustrating the state where compression is released.

Referring now to FIGS. 5–7, there are shown the second embodiment of the filter element of the present invention. In the filter element of the second embodiment, a filter medium 33 to be held under compression by the holder 5 is formed by stacking a plurality of annular resilient plates 33A in a cylindrical shape.

Respective plates 33A are made of a hard material such as metal or ceramics as in the case of the resilient wire rod 3a, and comprise a plurality of spring portions 33a for resiliently widening gaps between adjacent plates 33A and a plurality of projection 33b as compression limiting means for providing required filtration gaps between adjacent plates 33A when the filter medium 33 is compressed. These spring portions 33a and projections 33b are formed by making evenly spaced incisions on the plate 33A in the same direction and raising them up. Respective plates 33A are then stacked on top of each other with the positions of spring portion 33a of adjacent plates 33A staggered alternately by half a pitch to form the laminated body 33.

Since the holder used in the second embodiment may employ the same structure as the first embodiment, FIGS. 1 and 2 may be referred to know the structure of the holder and thus it is not specifically shown in a figure here.

In the filter element of the second embodiment with the structure described above, the filter medium 33 formed by stacking annular plates 33A is held by the holder 5 under compression as shown in FIG. 5. At this time, the spring portions 33a of respective plates 33A are deformed to the extent where the projections 33b come into contact with adjacent plates 33A, and thereby between adjacent plates 33A, 33A, there are formed filtration gaps of a width provided by the height of the projections 33b.

On the other hand, when compression applied to the filter medium 33 is released, as shown in FIG. 7, the filter medium 33 is expanded by resilient restoring force of the spring portions 33a of respective plates 33A, and consequently the filtration gaps between adjacent plates 33A, 33A are widened almost uniformly.

Accordingly, since the filtration gaps of the filter medium 33 in the filter element may be widened easily, foreign materials filtered out may be removed easily by cleaning.

Especially, the filter medium 33 of the second embodiment is formed of a plurality of plates 33A which can be disassemble, cleaning may be performed for each individual plate 33A after disassembling them into pieces, which makes removal of foreign materials by cleaning easier. Moreover, restacking of plates in this case is also easy.

Referring now to FIGS. 8–13, there are shown the third embodiment of the present invention. The filter element 61 of the third embodiment is configured in such a manner that the filter medium 63 to be held by the holder 65 under compression is formed in generally cylindrical shape by stacking a plurality of annular spring members 63A and a plurality of annular gap forming members 63B as compression limiting means alternately in layers.

Figure 10:
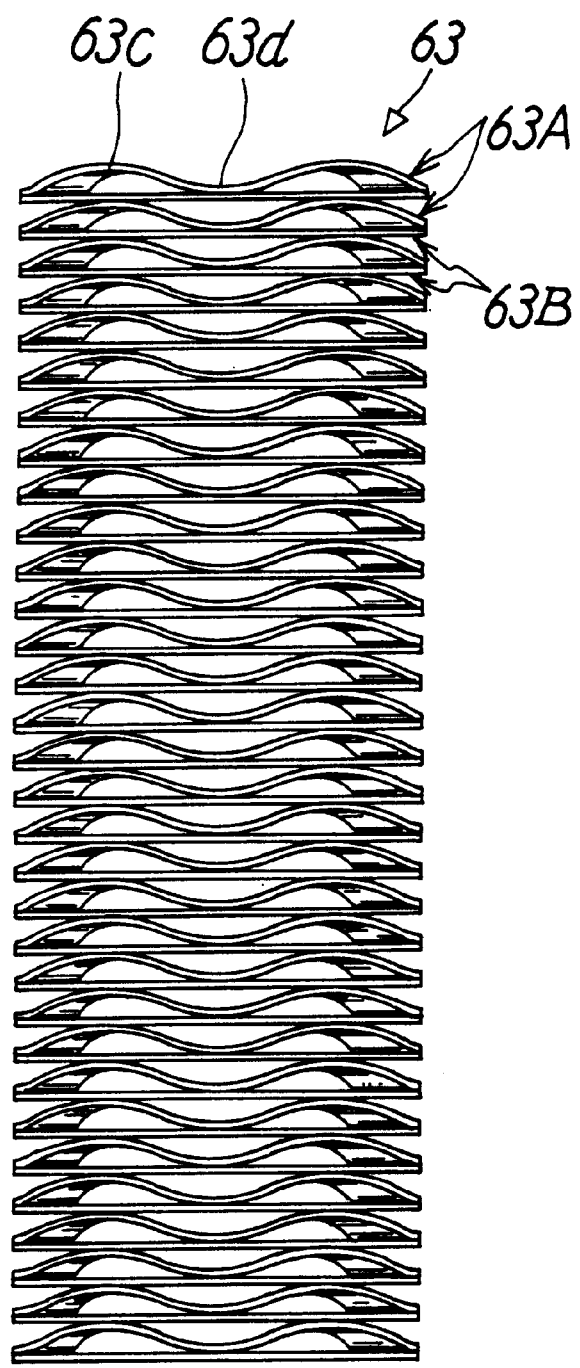
FIG. 10 is a side elevational view of the third embodiment illustrating the state where compression of the laminated body formed of spring members and gap forming members is released.
Figure 13:
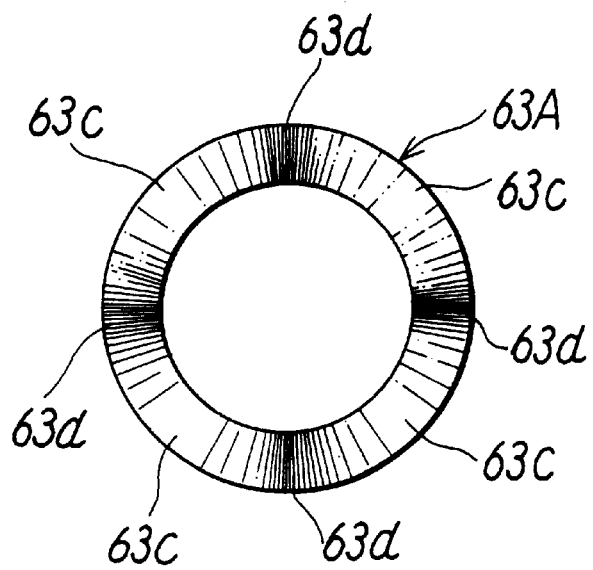
FIG. 13 is a plan view of a spring member according to the third embodiment.

The spring members 63A are, as seen in FIG. 10 and FIG. 13, corrugated in the direction of thickness so that they may resiliently widen the gaps between adjacent gap forming members 63B when the filter medium 63 is not compressed, and they may be resiliently deformed into flat plates to come into intimate contact with the gap forming members 63B when the filter medium 63 is compressed. In FIG. 13, parts 63c designate upwardly raising convex surfaces, and parts 63d designates downwardly depressed concave surfaces.

Figure 11:
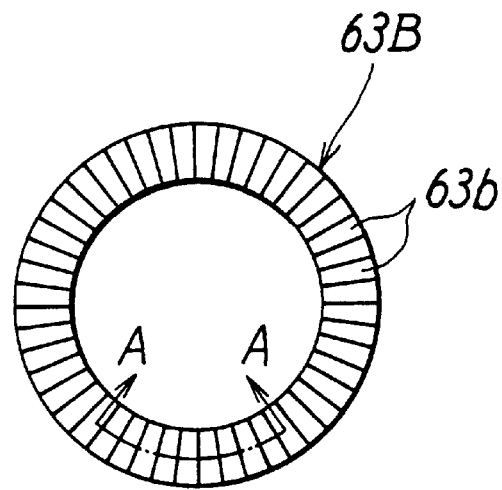
FIG. 11 is a plan view of the same gap forming member.
Figure 12:
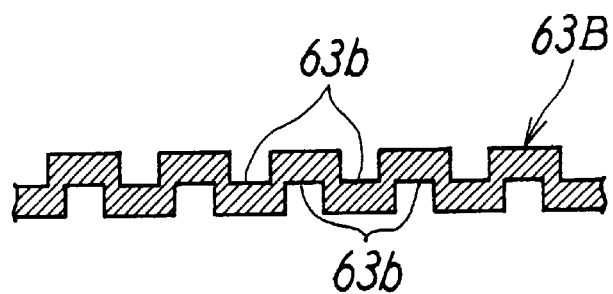
FIG. 12 is an enlarged end view of the gap forming member taken on line A—A of FIG. 11.

The gap forming members 63B are, as shown in FIGS. 11 and 12, have a plurality of radially extending filtration channels 63b on both front and back surfaces, and the filtration channels on the upper surface 63b are displaced from the filtration channels on the lower surface 63b by half a pitch.

Figure 8:
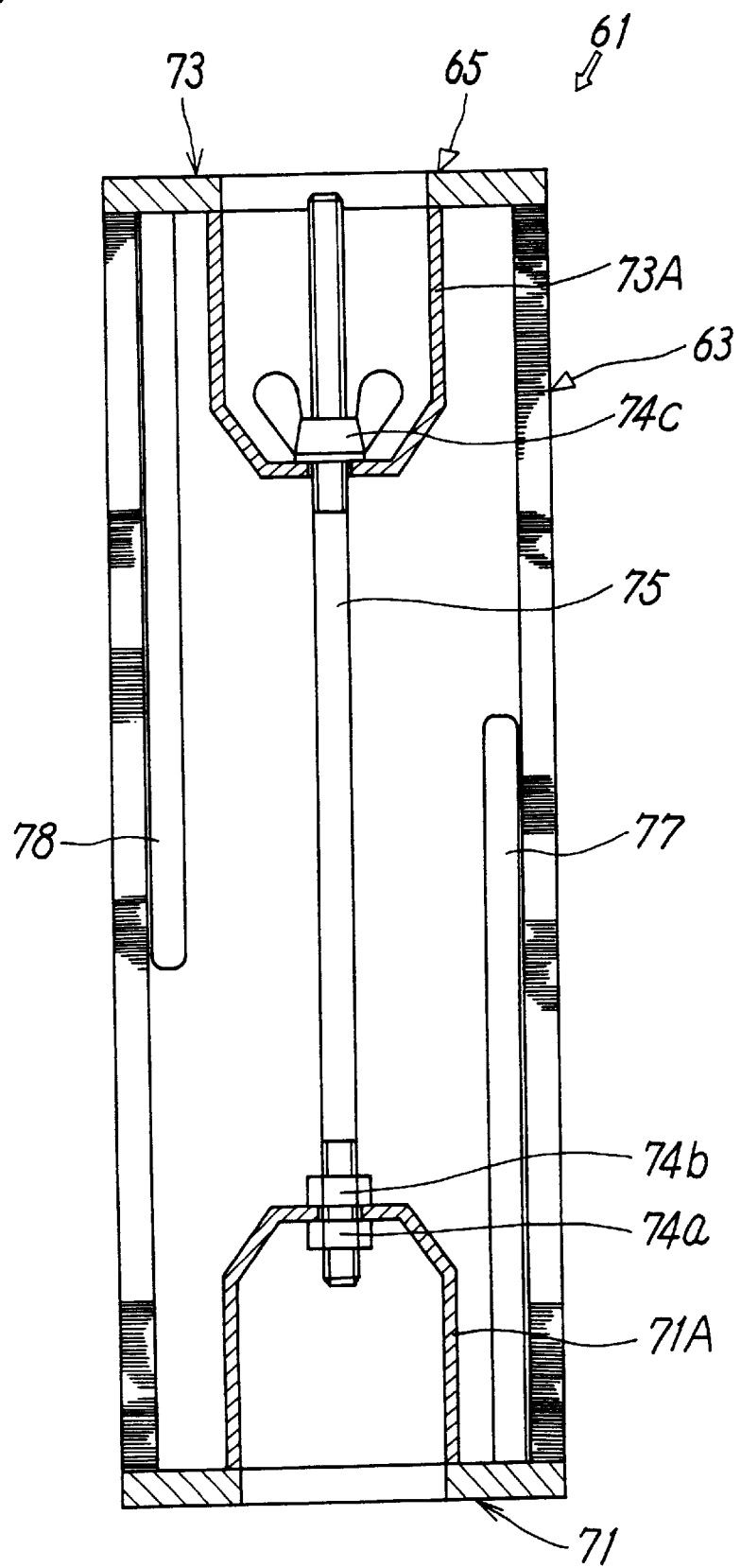
FIG. 8 is a sectional side elevational view of a filter element according to the third embodiment.
Figure 9:
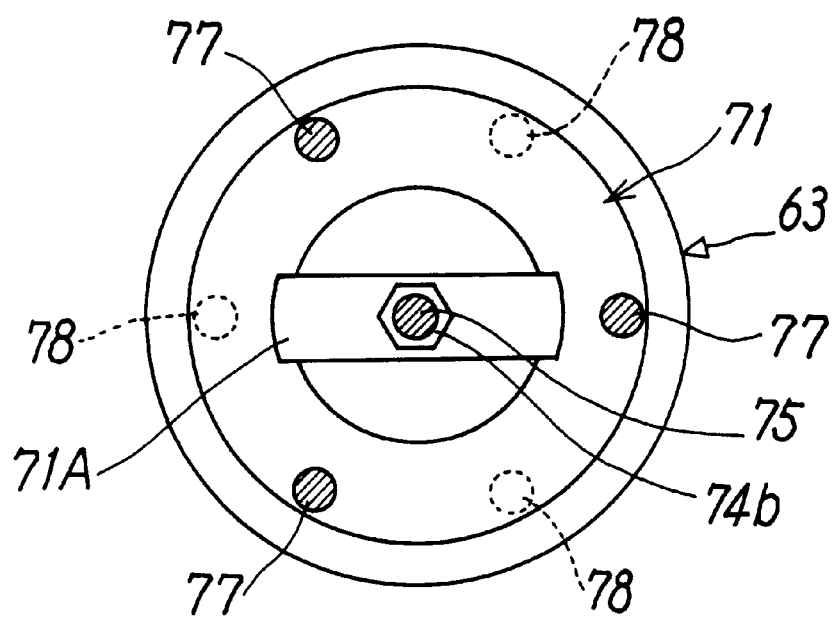
FIG. 9 is a plan view of the same.

On the other hand, the holder 65 is, as shown in FIGS. 8 and 9, comprises two end plates 71, 73 for catching the filter medium 63 from both sides, a tension bolt 75 for adjusting the distance between these end plates 71, 73, and a plurality of guide bars 77, 78 for supporting the filter medium 63 from inside.

On the inner surfaces of the end plates 71, 73, there are provided supporting members 71A, 73A. On one supporting member 71A, one end of the tension bolt 75 is secured by means of nuts 74a, 74b, and on the other supporting member 73A, the other end of the tension bolt 75 is secured by a butterfly nut 74c, and the tension bolt 75 may be expanded and contracted by rotating the butterfly nut 74c to adjust the distance between the end plates 71 and 73.

The guide bars 77, 78 have a length shorter than the axial length of the holder 65 but longer than a half the axial length thereof, and are mounted to respective end plates 71, 73. In other words, the end plate 71 located at the bottom of the holder is provided with guide bars 77 mounted in the direction of the axis of the holder 65 at equiangular intervals, and the upper end plate 73 is provided with other guide bars 78 mounted at equiangular intervals so as not to cause interference with the guide bars 77. These guide bars 77, 78 support spring members 63A and gap forming members 63B which constitute the filter medium 63 from the inside to maintain their stacked shape.

The filter medium 63 is disposed between the end plates 71, 73 with the guide bars 77, 78 inserted into the end plates 71, 73, and held between the end plates 71, 73 under compression by tightening the butterfly nut 74c and thereby contracting the tension bolt 75.

In the filter element 61 of the third embodiment having above described structure, when the filter medium 63 formed by stacking annular spring members 63A and annular gap forming members 63B alternately is compressed by the holder 65, the spring members 63A are flattened and brought into intimate contact with the gap forming members 63B so that a constant filtration gaps are formed by the filtration channels 63b provided on both front and back surfaces of the gap forming members 63B.

On the other hand, when compression applied by the holder 65 is released, the filtration gaps between adjacent gap forming members 63B are expanded due to restoration of the spring members 63A into corrugated shape.

The holder 5 of the first and second embodiments and the holder 65 of the third embodiment described above may be used respectively for holding filter medium of other embodiments as well. In other words, the holder 5 may be used also for holding the filter medium 63 of the third embodiment comprising spring members 63A and gap forming members 63B, while the holder 65 may be used for holding the filter medium 3 and 33 of the first and second embodiments as well.

Especially when the holder 65 of the third embodiment is used for holding the filter medium 33 of the second embodiment, as shown in FIG. 6, a plurality of recesses 33c may be provided radially on the inner radius of the plate 33A so that the guide bars 77, 78 mounted on the holder 65 may be fitted into these recesses 33c. In this case, the recesses 33c are to be formed as many as the number of the guide bars 77, 78.

The structure of the holder is not limited to ones illustrated in respective embodiments, and other appropriate structures may be employed as far as they can hold the filter medium under compression.

As described so far, according to the present invention, the filter element which may filter out foreign materials to be removed contained in a fluid satisfactory, and may be cleaned easily in a short period of time for reuse is provided.

What is claimed is:

1. A filter element to be used in a filtering apparatus for filtering a fluid, comprising:

a cylindrical filter medium having a plurality of filtration gaps on the side wall thereof; and a holder for holding said filter medium;

said filter medium comprises a plurality of stacked annular spring members and a plurality of annular gap forming members positioned so as to be resiliently expandable in an axial direction, said spring members being corrugated in a thickness direction so as to be resiliently deformable into a flat plate shape when said filter medium is compressed, wherein said gap forming members include a plurality of radially extending filtration channels formed thereon.

2. The filter element of claim 1, wherein said filtration gaps are located on both front and back surfaces of the gap forming members.

3. The filter element of claim 1, wherein said holder comprises two end plates for catching the filter medium from both sides thereon in the axial direction, a tension bolt for adjusting the distance between said end plates, and a plurality of guide bars for supporting the filter medium from an inside portion thereof.

4. The filter element of claim 3, which comprises a plurality of supporting members located on the inner surfaces of the end plates, wherein a first end unit of the tension bolt is secured on a first end of said supporting member by means of at least one unit, and a second end of the tension bolt is secured on a second end of said supporting member by a butterfly nut, and wherein said tension bolt is expandable and contractable by rotation of the butterfly nut so as to adjust a distance between the end plates.

5. The filter element of claim 3, wherein each of said plurality of guide members has a length dimension shorter than the axial length dimension of the holder, said guide member length dimensions being longer than half the holder axial length dimension, and wherein said guide members are mounted on said end plates.

* * * * *